Sept. 26, 1950             LE ROY E. THOMAS            2,523,975
PERISCOPE SPECTACLES
Filed July 12, 1948                             2 Sheets—Sheet 2
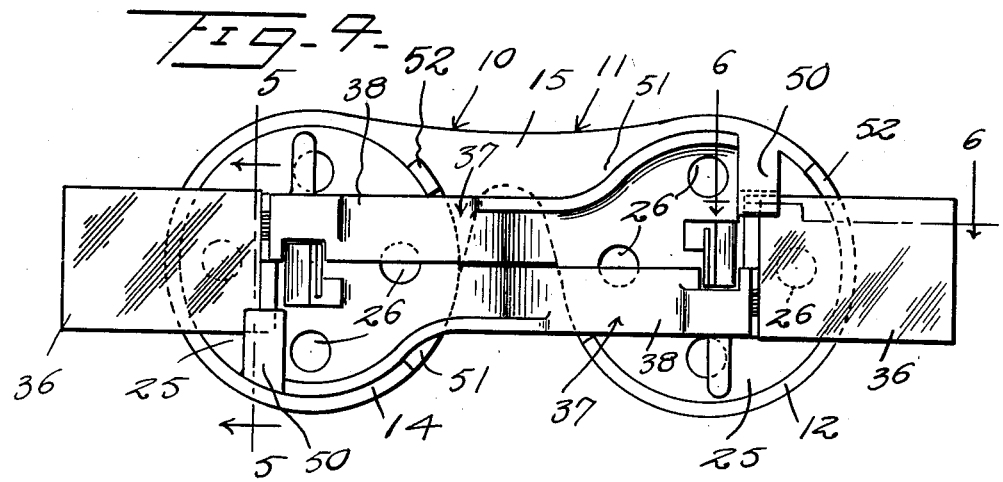
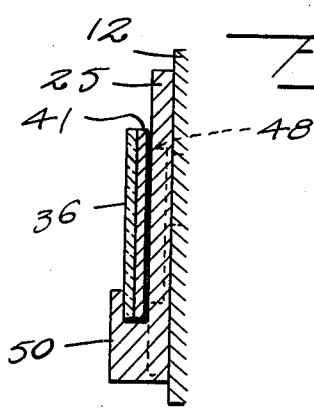
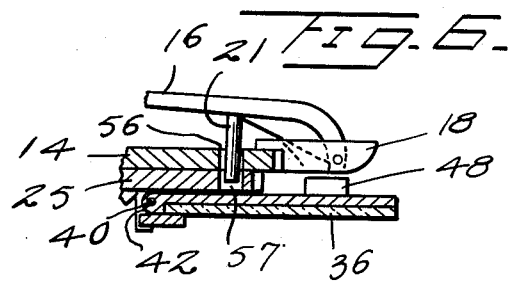
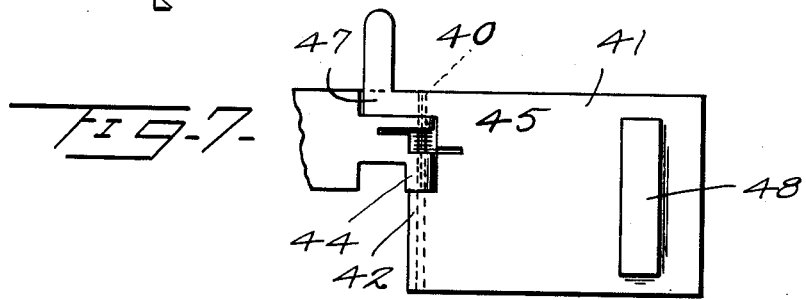
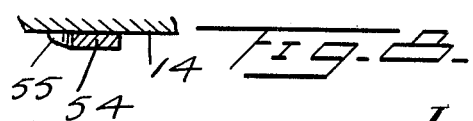
Inventor
L. E. Thomas
By Kimmel & Crowell
Attorneys Patented Sept. 26, 1950

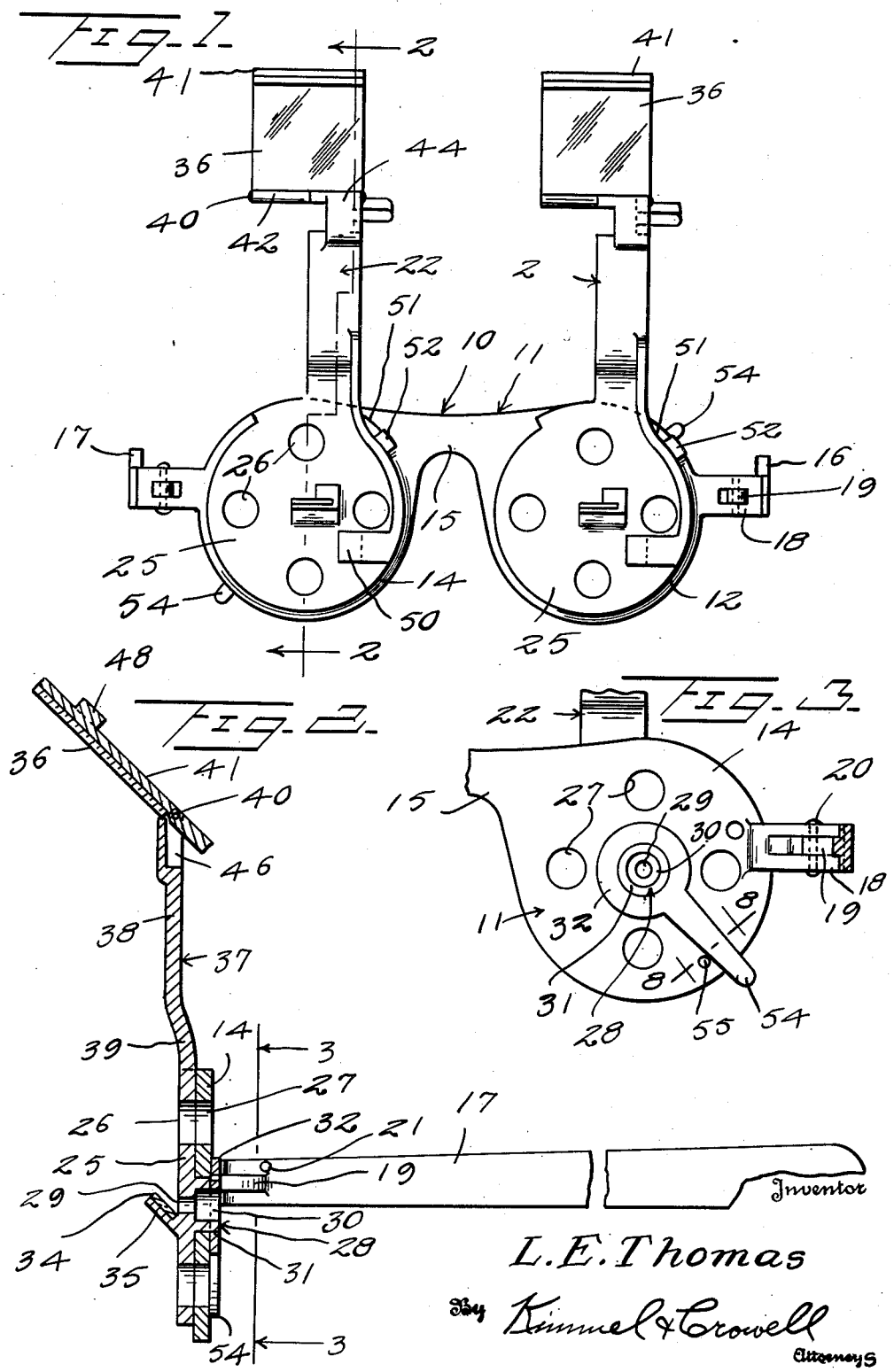

2,523,975

UNITED STATES PATENT OFFICE 2,523,975

PERISCOPE SPECTACLES

Le Roy E. Thomas, Cleveland, Ohio

Application July 12, 1948, Serial No. 38,341

2 Claims. (Cl. 88—41)

This invention relates to periscopes and more particularly to folding periscope spectacles.

It is an object of this invention to provide improved periscope spectacles of the kind to be more particularly described hereinafter as an improvement over my Patent No. 2,255,197 issued September 9, 1941, for a Periscope.

Another object of this invention is to provide folding periscope spectacles which may be collapsed from an extended position to a relatively compact closed position whereby the closed spectacles may be stored or carried in a minimum amount of space, as in a pocket or purse of the user. The compact closed spectacle is accomplished by securing the periscope members on a spectacle frame and forming the periscope members in such a manner that portions of the periscope may be displaced in the selected extended or folded positions. The movable portions of the periscope are spring pressed to the forward viewing position so that the periscope members are biased to periscopic relation in their extended or unfolded position.

Still another object of this invention is to provide spectacles of this kind having a pleasing and desirable appearance to thereby increase the commercial appeal therefor, and so constructed and arranged that the movable elements are so supported in their folded position that inadvertent movement thereof is prevented and the accidental breakage is reduced to a very minimum.

The mirrors or reflector elements of the periscope members of the spectacles are supported substantially in the open rather than at the ends of a tube thus overcoming the "barrel" effect of periscopes heretofore used. As two periscope members are used and each is to be related to one eye of the user, the three dimensional effect is obtained thus creating a more natural and pleasant appearance of the scene viewed. Small viewing apertures are used in this structure to concentrate the image and thereby exclude other distracting images, as the spectacle structure, from the sight.

A further object of this invention is to provide periscope spectacles of this kind which may be used with the conventional glasses for improving or aiding the vision of the user, and so constructed and arranged that in the use of the periscope members as such, the field of vision of the wearer is not restricted to the image through the periscope but the immediate field adjacent the wearer may be viewed on either side, above or below the mirror immediately in front of the eyes. This feature is possible with or without the use of conventional glasses.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings,

Figure 1 is a front elevation of a pair of periscope spectacles constructed according to an embodiment of this invention showing the periscope members in an extended position;

Figure 2 is a vertical section taken on the line 2—2 of Figure 1;

Figure 3 is a fragmentary rear elevation of one of the periscope members taken on the line 3—3 of Figure 2;

Figure 4 is a front elevation showing the spectacles in their collapsed or folded position;

Figure 5 is a fragmentary vertical section taken on the line 5—5 of Figure 4;

Figure 6 is a fragmentary horizontal section taken on the line 6—6 of Figure 4;

Figure 7 is a fragmentary rear plan view of one of the movable reflector elements and Figure 8 is a fragmentary detailed section taken on the line 8—8 of Figure 3.

Referring to the drawings, the numeral 10 designates generally a pair of spectacles constructed according to an embodiment of this invention for viewing a scene above the normal line of vision as in a theater or the like. The spectacles 10 are formed with a base or spectacle frame 11 which includes a pair of fixed supporting discs 12 and 14. The supporting members or discs are connected together by a bridge 15 in the manner of the conventional type of spectacle. Rearwardly extending temple bars as 16 and 17 are hingedly connected to the sides of the supporting plates or discs 12 and 14 respectively. A pair of hinge leaves 18 are fixed on the supporting members and extend substantially radially outward therefrom. A hinge leaf 19 is fixed to or formed on the forward end of the temple bars and is pivotally connected between the leaves 18 by a pivot pin 20 whereby the temple bars may be folded to a rearwardly extending position for supporting the spectacles 10 on the wearer or may be disposed in a folded position overlying the rear frame surfaces of the supporting base 11. Inwardly extending locking pins as 21 are fixed to or formed on the inner surfaces of the temple bars 16 and 17 closely adjacent the hinge connection to the supporting member. The locking pins 21 are provided for locking the periscope members to be described hereinafter in the folded or retracted position. As the temple bars 16 and 17 are of a similar construction the detailed description of one will be adapted to the description of the other.

A pair of periscope members as 22 and 24 are rotatably mounted on the spectacle frame 11 for positioning either in an erect position for forward viewing or in a folded position overlying the base member 11 for carrying the spectacles. Both of the periscope members 22 and 24 are similar in substantially every detail so that the description of one is applicable to the description of the other and the differences between them will be pointed out hereinafter.

The periscope member 22 is formed with an annular disc or base 25 of substantially the same configuration as the base or frame disc 14. The disc 25 is formed with a plurality of circumferentially spaced apart annular openings as 26 which are adapted to register with similar openings 27 formed in the base or frame disc 14. The openings 26 and 27 are spaced diametrically apart along the horizontal axis of the periscope member in the erect or extended position thereof and one pair of these openings is disposed along the vertical axis whereby the vision of the wearer may be diverted from the central opening of the periscope for viewing objects in the immediate vicinity without resorting to the periscope. A rearwardly extending pivot member 28 is fixed to or formed on the rear surface of the disc 25. The pivot member 28 is formed of a tubular body open at the front and rear ends thereof. The opening 29 at the center of the disc 25 communicates with the opening 30 through pivot member 28. The opening 29 is of a reduced diameter for aiding in reducing the view of the image to be observed through the opening 29 and 30. The walls of the pivot member 28 extend rearwardly through a central opening 31 in the frame disc 14. An annular washer 32 is fixed to or formed about the periphery of the rear end of the pivot member 28 and engages the rear wall of the frame disc 14 for rotatably supporting the periscope member 22 thereon.

A reflector element 34 is fixed on the rotatable disc 25 by an inclined supporting member 35. The reflector element or mirror 34 is positioned immediately in front of the opening 29 through the disc 25 and the supporting member 35 is inclined upwardly at an angle of approximately 45° relative to the axis of the pivot member 30 and the opening 29. The reflector element 34 is positioned for reflecting the image to be viewed from an upper reflector element 36 rearwardly through the openings 29 and 30 so that the image may be viewed by the wearer. An upwardly extending arm as 37 is fixed to or formed integral with the disc 25 for supporting the upper reflector element or mirror 36. The upper end of the arm 37 is off-set forwardly as clearly indicated in Figure 2 of the drawings for folding the spectacles in the manner to be described hereinafter. The upper portion 38 of the arm 37 is disposed in parallel relation to the lower portion 39 thereof and is forwardly off-set a distance substantially equal to the thickness of the arm.

The upper reflector element 36 is hingedly supported on the upper end of the arm 37 by a hinge pin 40 which extends through the barrel of a hinge which is formed integral with the supporting member 41 of the mirror 36. The supporting member 41 is formed of a flat plate on the forward side of which the mirror 36 is adapted to be secured. The lower end of the plate 41 is cut away to provide a pair of hinge barrels 42 spaced apart intermediate the length thereof and the correlated hinge barrel 44 fixed to or carried by the upper end of the arm 37 is adapted to be engaged between the barrels 42. A coil spring as 45 is positioned about hinge pin 40 between the barrels 42 and 44 and one arm of the spring engages the rear surface of the mirror supporting member 41 and the other end of the spring engages the rear surface of the upper end of the supporting arm 37 for constantly urging the plate 41 and the mirror 36 to a forwardly inclined position as shown in Figure 2 of the drawings. The upper end of the arm 37 is substantially thicker than the cross section of the remainder of the arm and a recess 46 is formed therein. The recess 46 opens upwardly and rearwardly of the arm 37 and provides stop means for limiting the hinged movement of the supporting plate 41. A stop arm as 47 is fixed to or formed on the lower end of the plate 41 and is adapted to engage in the recess 46 for limiting the rearward swinging movement of the plate 41 to an aligned position relative to the length of the arm 37. As the hinge pin 40 and the hinge barrels associated therewith are disposed along the upper edge of the arm 37 rearwardly of the upper end thereof the extreme upper end of the arm 37 is adapted to engage the forward side of the plate 41 for limiting the forward swinging movement thereof to approximately 45° so that the mirror 36 will reflect an image on to the mirror 34 along a line parallel to the axis of the openings 29 and 30. A stop member or pad 48 is fixed to the rear surface of the plate 41 for the purpose to be described hereinafter.

A hook as 50 is fixed to or formed on the forward side of the disc 25 below the supporting member 35. The hook 50 is disposed for opening toward one side of the spectacles when the periscope members are disposed in their forward viewing position. A segmental stop member 51 is formed on the upper edge of the plate 25 and is adapted to be engaged with a correlated stop member or pin 52 fixed to or formed on the forward side of the frame 15. The stop member 51 is adapted to abut the pin 52 for limiting the swinging movement of the periscope member to a vertical position as shown in Figure 1 of the drawings. An elongated handle or operating lever 54 is fixed to or formed integral with the washer 32 disposed on the rear end of the pivot member 28. The lever 54 extends radially of the discs 14 and 25 and due to the resilient formation thereof is constantly biased into engagement with the rear surface of the fixed frame disc 14. A rearwardly extending detent 55 is fixed to or formed on the rear surface of the frame member 14 and the lever or arm 54 is adapted to slide over the detent 55 and abut one side thereof when the stop member 51 engages the pin 52. In this manner the periscope member 22 is held against rotation when it is positioned in the forward viewing position shown in the drawings. For moving the periscope to a folded position the lever 54 may be pressed rearwardly so that the entire periscope member may be rotated about pivot member 28 to the folded position.

Both of the periscope members 22 and 24 are supported for rotation on the pivot member 25 in the same direction for movement from the extended to the folded position. While the formation of both of the periscope members is substantially the same, the lever arm 54 of one of the members as 22 is disposed in a downwardly inclined direction while the lever arm 54 of the periscope member 24 is disposed in an upwardly extended position, this difference being clearly shown in Figure 1 of the drawings. Both of the discs 14 and 25 are provided with an opening therethrough indicated by the numerals 56 and 57. The openings 56 and 57 are positioned adjacent the periphery of the discs and are disposed for axial alignment when the periscope members are positoned in their folded relation to the frame. As the periscope members are folded and the openings 56 and 57 become aligned, the pin 21 carried by the temple bars is adapted to be engaged in the openings when the temple bars are folded to overlie the rear of the frame thereby locking the periscope members against inadvertent rotation.

In the use and operation of the periscope spectacles described above for moving the periscope members 22 and 24 from the extended position shown in Figure 1, the locking levers 52 and 54 are positioned rearwardly and both of the periscope members are rotated a short distance in a counter-clockwise direction as viewed in Figure 1. The right periscope member 22 is adapted to be rotated substantially 270° while the left periscope member 24 will be rotated 90° to the folded position. The right member 22 will be moved first to substantially its completely folded position and then the left member 24 will be moved. When the right member 22 has reached its completely folded position the hook 50 will open upwardly on the right side of the frame 11 and when the left member 24 is rotated to its fully folded position the hook 50 thereon will be disposed in a downwardly opening position. As both of the periscope members near their fully folded position the upper reflector element 36 and its supporting plate 41 will be folded rearwardly against the tension of the spring 45. The reflector elements and their support will then be disposed in alignment with the arms 37 and as the reflector elements extend beyond the end of the arms, the reflector element in this aligned position will be engageable underneath the bill of the hooks 50. In this manner when the reflector elements 36 and their supporting plates 41 are engaged in the hooks 50 as shown in Figure 5 of the drawings, the periscope members will overlie one another as the off-set arm 37 provides for this overlying relation and both of the periscope members will flatly overlie the forward surface of the frame 11. Upon swinging of the temple bars 16 and 17 so that they overlie the rear surface of the frame 11 the pins 21 will engage in the openings 56 and 57 for securing the periscope members against rotation.

In the completely folded and locked position of the spectacles, the pads 48 carried on the rear surface of the upper mirror supporting plate are disposed between the plates 41 and the forward surface of the rotatable disc of the other periscope member providing a brace or cushion for solidly securing the folded periscope members against the supporting frame.

What is claimed is:

1. Periscopic spectacles comprising a frame including a pair of spaced centrally apertured supporting discs and a pair of periscope members pivotally mounted on said supporting discs, each of said members including a centrally apertured disc, a connecting arm extending radially of said last mentioned disc, a fixed reflecting element adjacent said central aperture on said disc and mounted at an acute angle relative to said disc, a second reflecting element hingedly connected to an end of said arm cooperating with said fixed reflecting element to afford a periscopic view, an open ended tubular pivot extending through the aligned apertures in said supporting discs and said second mentioned discs to form a sight opening in alignment with said fixed reflecting element, said supporting discs and said second mentioned discs each being provided with a plurality of radially disposed apertures adapted to be aligned to form direct view sighting apertures when said members are in periscopic relation, said tubular pivot pins providing means whereby said periscopic elements may be rotated from vertical periscopic position to horizontal folded position, and means for locking said periscopic elements in horizontal folded position.

2. Periscopic spectacles comprising a frame including a pair of spaced centrally apertured supporting discs or temples foldably secured to said discs, and a pair of periscope members pivotally mounted on said supporting discs, each of said members including a centrally apertured disc, a connecting arm extending radially of said last mentioned disc, a fixed reflecting element adjacent said central aperture on said disc and mounted at an acute angle relative to said disc, a second reflecting element hingedly connected to an end of said arm cooperating with said fixed reflecting element to afford a periscopic view, means limiting the hinged movement of said second reflecting element between a coplanar position relative to said arm and a periscopic relation to said first reflecting element, a spring on said hinge biasing said reflecting element to inclined angular position in said arm for periscopic relation to said fixed reflecting element, an open ended tubular pivot extending through the aligned apertures in said supporting discs and said second mentioned discs to form a sight opening in alignment with said fixed reflecting element, said supporting discs and said second mentioned discs each being provided with a plurality of radially disposed apertures adapted to be aligned to form direct view sighting apertures when said members are in periscopic relation, said tubular pivot pins providing means whereby said periscopic elements may be rotated from vertical periscopic position to horizontal folded position, pins carried by said temples and openings formed in said supporting and said second mentioned discs adapted to be aligned when said periscopic elements are in horizontal position whereby upon folding said periscopic elements and said temples, said pins engage said openings to lock said periscopic elements in folded position.

LE ROY E. THOMAS.

REFERENCES CITED

The following references are of record in the file of this patent:

UNITED STATES PATENTS

| Number | Name | Date |
|---|---|---|
| 1,521,339 | Taylor | Dec. 30, 1924 |
| 1,610,553 | Jones | Dec. 14, 1926 |
| 1,751,567 | Wadsworth | Mar. 25, 1930 |
| 1,884,137 | Newman | Oct. 25, 1932 |
| 2,255,197 | Thomas | Sept. 9, 1941 |

FOREIGN PATENTS

| Number | Country | Date |
|---|---|---|
| 2,345 | Great Britain | of Feb. 13, 1915 |
| 4,397 | Great Britain | of Mar. 20, 1915 |
| 204,557 | Switzerland | May 15, 1939 |
| 101,668 | Sweden | May 27, 1941 |